(12) United States Patent
Cheng et al.

(10) Patent No.: US 8,675,787 B2
(45) Date of Patent: Mar. 18, 2014

(54) CIRCUIT FOR DETECTING A PREDETERMINED SYMBOL IN A DIGITAL DATA STREAM AND ASSOCIATED METHOD

(75) Inventors: Kai-Wen Cheng, Hsinchu Hsien (TW);
Ko-Yin Lai, Hsinchu Hsien (TW);
Yi-Ying Liao, Hsinchu Hsien (TW);
Tai-Lai Tung, Hsinchu Hsien (TW)

(73) Assignee: MStar Semiconductor, Inc. (TW)

(*) Notice: Subject to any disclaimer, the term of this patent is extended or adjusted under 35 U.S.C. 154(b) by 733 days.

(21) Appl. No.: 12/728,912

(22) Filed: Mar. 22, 2010

(65) Prior Publication Data

US 2010/0284498 A1 Nov. 11, 2010

Related U.S. Application Data

(60) Provisional application No. 61/176,955, filed on May 11, 2009.

(51) Int. Cl.
*H04L 27/06* (2006.01)

(52) U.S. Cl.
USPC .......................................... 375/343

(58) Field of Classification Search
USPC ................. 375/142, 143, 150, 152, 260, 343; 708/314, 422, 426
See application file for complete search history.

(56) References Cited

U.S. PATENT DOCUMENTS

| | | | | |
|---|---|---|---|---|
| 5,247,470 A | * | 9/1993 | McKown et al. | 708/314 |
| 6,563,859 B1 | * | 5/2003 | Oishi et al. | 375/148 |
| 2002/0196731 A1 | * | 12/2002 | Laroia et al. | 370/206 |
| 2007/0263752 A1 | * | 11/2007 | Guey et al. | 375/340 |

* cited by examiner

*Primary Examiner* — Young T. Tse
(74) *Attorney, Agent, or Firm* — Han IP Corporation (57) ABSTRACT

A circuit for detecting a predetermined symbol of a digital data stream includes a frequency shifter, a correlator, a filter and a decision unit. The frequency shifter performs inverse-frequency shifting upon a first data to generate a first frequency-shifted data. The correlator calculates correlation upon the first frequency-shifted data and a second data to generate a correlated data. The filter, coupled to the correlator, filters and the correlated data to generate a filtered correlated data according to a time-domain windowing length. The decision unit, coupled to the filter, determines the predetermined symbol from the digital data stream according to the filtered correlated data.

20 Claims, 8 Drawing Sheets

FIG.1

(PRIOR ART)

CIRCUIT FOR DETECTING A PREDETERMINED SYMBOL IN A DIGITAL DATA STREAM AND ASSOCIATED METHOD

CROSS REFERENCE TO RELATED PATENT APPLICATIONS

This patent application claims priority to U.S. Provisional Patent Application No. 61/176,955, entitled "Circuit for Detecting a Predetermined Symbol in a Digital Data Stream and Associated Method", filed on May 11, 2009 and incorporated herein by reference.

TECHNICAL FIELD

The present disclosure relates to a circuit for detecting a predetermined symbol in a digital data stream and an associated method.

BACKGROUND

In the Digital Video Broadcasting over Terrestrial 2 (DVB-T2) system, data transmission is completed in the form of data frames. At a beginning of each data frame is a P1 symbol that contains certain information at a transmitting end, such as information of a fast Fourier transform (FFT) mode for data modulation and information of an antenna transceiving type for identifying multiple-input or single-input. Therefore, upon receiving a digital data stream compliant with the DVB-T2 specification, a receiver needs to first retrieve information carried in the P1 symbol in order to configure the demodulation for correctly demodulating the digital data stream.

Figure 1:
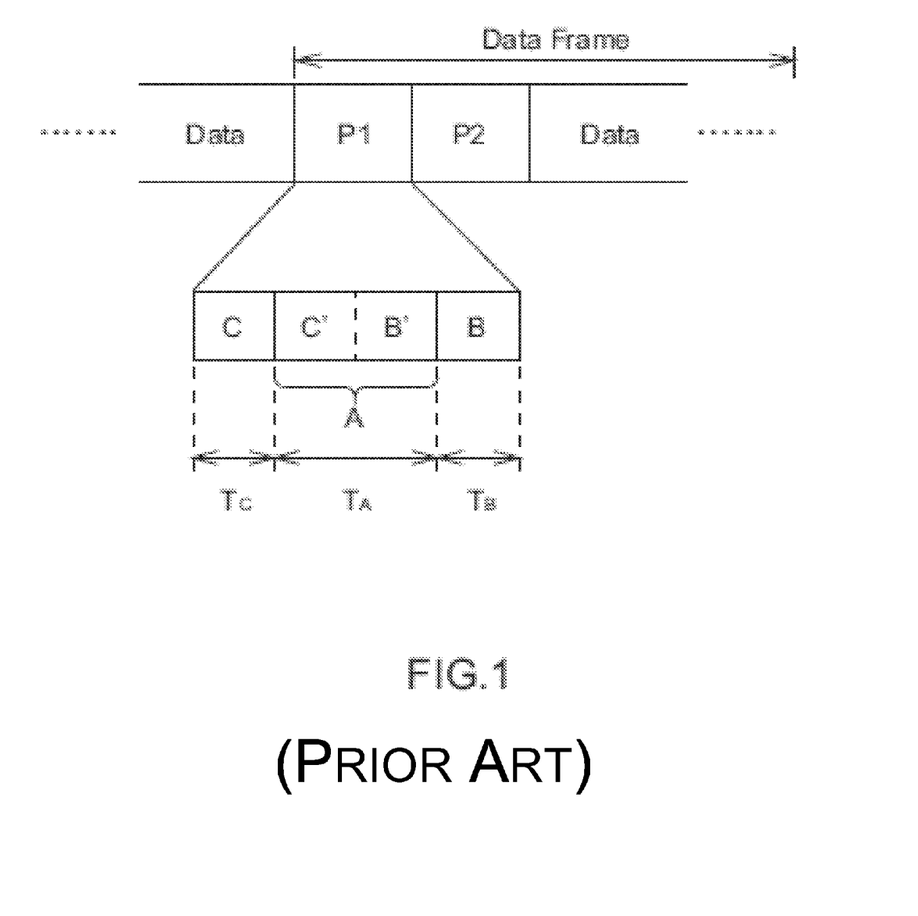
FIG. 1 is a schematic view of a DVB-T2 compliant digital data stream containing a P1 symbol.

FIG. 1 shows a schematic view of a DVB-T2 compliant digital data stream containing a P1 symbol. As shown, a data frame comprises a P1 symbol, a P2 symbol and data. The P1 symbol is mainly consisted of three data in sequence, namely a data C with 542 samples and a time length of $T_C$, a data A with 1024 samples and a time length of $T_A$, and a data B with 482 samples and a time length of $T_B$. Further, the data C is a frequency-shifted data generated by performing frequency shifting upon a first half of the data A (i.e., a data C'), and the data B is a frequency-shifted data generated by performing frequency shifting upon a second half of the data A (i.e., a data B'). An equation for the P1 symbol $p_1(t)$ is as follows:

$$p_1(t) = \begin{cases} p_{1A}(t)e^{i\frac{2\pi}{1024T}t} & 0 \le t < 542T \\ p_{1A}(t-542T) & 542T \le t < 1566T \\ p_{1A}(t-1024T)e^{i\frac{2\pi}{1024T}t} & 1566T \le t < 2048T \\ 0 & \text{otherwise,} \end{cases}$$

where $P_{1A}$ is content of the data A, and T is a sampling cycle of the digital data stream.

Since the data C and B are frequency-shifted data respectively generated by performing frequency shifting upon a part of the data A, correlation between the data C and B and the data A may be looked into to determine whether a currently received data is the P1 symbol. In addition, by comparing correlation between the data C and B and the data A, a location of the P1 symbol may be identified to correctly retrieve the P1 symbol from the digital data stream. However, identifying a location of the P1 symbol from the digital data stream is quite a challenging task, and errors may result in subsequent data demodulation based on an incorrect location of the P1 symbol.

SUMMARY

Therefore, one of the objectives of the present disclosure is to provide a circuit for detecting a predetermined symbol in a digital data stream and an associated method, which are capable of accurately determining a location of the predetermined symbol in the digital data stream to solve the foregoing issues.

According to one embodiment of the present disclosure, a circuit for detecting a predetermined symbol in a digital data stream comprising a frequency shifter, a correlator, a filter and a decision unit is provided. The frequency shifter performs inverse-frequency shifting upon a first data to generate a first frequency-shifted data. The correlator calculates a first correlated data according to the first frequency-shifted data and a second data. The filter, coupled to the correlator, filters the correlated data according to a time-domain windowing length to generate a first filtered data. The decision unit, coupled to the filter, determines the predetermined symbol from the digital data stream according to the filtered correlated data.

According to another embodiment of the disclosure, a method for detecting a predetermined symbol in a digital data stream is provided. The predetermined symbol comprises a first data and a second data, and the first data is generated by performing frequency shifting upon the second data. The method comprises performing inverse-frequency shifting upon the first data to generate a first frequency-shifted data, calculating a correlated data according to the first frequency-shifted data and the second data, filtering the first correlated data according to a first time-domain windowing length to generate a first filtered data, and determining the predetermined symbol from the digital data stream according to the first filtered data.

BRIEF DESCRIPTION OF THE DRAWINGS

The present disclosure will become more readily apparent to those ordinarily skilled in the art after reviewing the following detailed description and accompanying drawings, in which.

DETAILED DESCRIPTION OF THE PREFERRED EMBODIMENT

Figure 2:
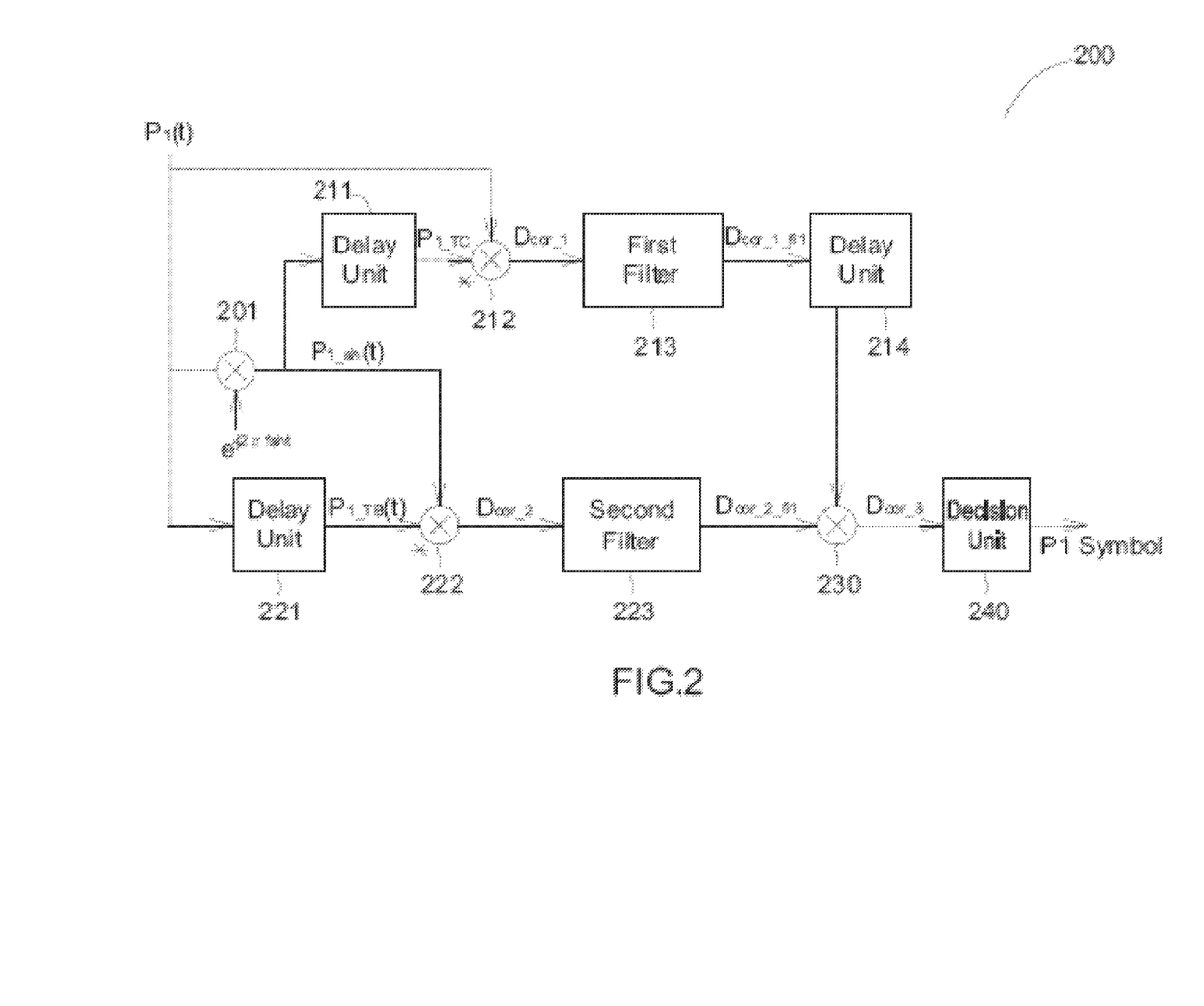
FIG. 2 is a schematic diagram of a circuit for detecting a predetermined symbol in a digital data stream according to a first embodiment of the disclosure.

Refer to FIG. 2 showing a schematic diagram of a circuit 200 for detecting a predetermined symbol in a digital data stream according to a first embodiment of the disclosure. As shown, the circuit 200 comprises a frequency shifter 201, three delay units 211, 214 and 221, a first correlator 212, a first filter 213, a second correlator 222, a second filter 223, a multiplier 230 and a decision unit 240. In this embodiment, the circuit 200 is applied to a DVB-T2 system, for detecting a P1 symbol (as illustrated in FIG. 1) in a digital data stream. The frequency shifter 201 performs inverse-frequency shifting upon a data C and a data B in the P1 symbol to generate a data Csh and a data Bsh that have same shifted frequencies as the data C' and the data B' in the data A. The delay unit 211, providing a delay of TC, i.e., the time of the 542 samples of the data C in the P1 symbol, delays the data Csh by a time of TC, such that the data Csh and the data C' enter the first correlator 212 in synchronization to reinforce correlation between the two. Similarly, the delay unit 221, providing a delay of TB, i.e., the time of the 482 samples of the data B in the P1 symbol, delays the data Bsh by a time of TB, such that the data Bsh and the data B' enter the second correlator 222 in synchronization to reinforce correlation between the two. Further, the delay unit 214 provides a delay of 2*TB, i.e., twice the time of the 482 samples of the data B in the P1 symbol, such that the correlated signals outputted from the first correlator 212 and the second correlator 222 enter the multiplier 230 in synchronization, which multiples the two correlated signals to enhance a peak of correlation between the two so as to facilitate determination for a start position of the P1 symbol.

The first filter 213 performs filtering by a time-domain windowing, of which a length is approximately equal to the number of samples in the data C in the P1 symbol; that is, a time-domain windowing length of the first filter 213 may be 542 or any integral approximating 542. Likewise, a time-domain windowing length of the second filter 223 is approximately equal to the number of samples in the data B in the P1 symbol; that is, the timed-domain windowing length of the second filter 223 may be 482 or any integral approximating 482. In addition, by taking reducing circuit complexity and circuit costs into consideration, the time-domain windowing length of the first filter 213 is designed as $2^M$, where M is a positive integer and, from all values of 2 to the power of n, $2^M$ is closest to the number of samples of the data C in the P1 symbol. More specifically, for example, the time-domain windowing length of the filter 213 may be 512. Similarly, the time-domain windowing length of the second filter 223 may be $2^N$, where N is a positive integer and, from all values of 2 to the power of n, $2^N$ is closest to the number of samples of the data B in the P1 symbol. However, when $2^8=256$ is selected as a time-domain windowing length for the first filter 213 and the second filter 223, same objectives are achieved in majority of situations; when of $2^{10}=1024$ is selected as a time-domain windowing length for the first filter 213 and the second filter 223, same objectives are achieved with increased costs resulted from an enlarged circuit area.

Figure 3:
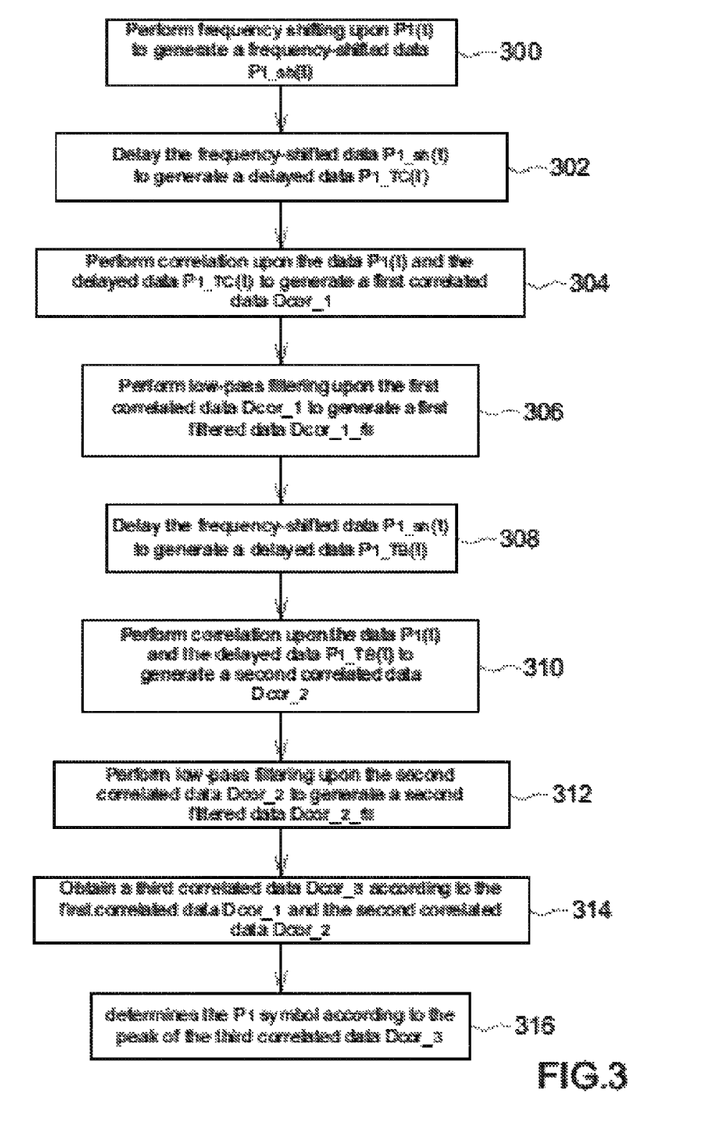
FIG. 3 is a flowchart of a method for detecting a predetermined symbol in a digital data stream according to an embodiment of the disclosure.

With reference to FIGS. 2 and 3, FIG. 3 shows a flowchart of a method for detecting a P1 symbol in a digital data stream according to one embodiment of the disclosure. At Step 300, by performs frequency shifting upon a digital data stream, the frequency shifter 201 restores frequency offset by the transmitting end upon the data B and the data C to generate a frequency-shifted data $P_{1\_sh}(t)$. Thus, the data Csh and the data Bsh in the frequency-shifted data $P_{1\_sh}(t)$ have the same frequency offset as the data C' and the data B' in the data $P_1(t)$; wherein, the frequency offset $f_{sh}$ is $1/2024T$, and T is the sampling cycle of the digital data stream. Supposing the data of the P1 symbol is $P_1(t)*e^{(j2\pi f_0 t)}$, where $f_0$ is a carrier frequency offset in the digital data stream, the frequency-shifted data $P_{1\_sh}(t)$ is represented as:

$$P_{1\_sh}(t)=P_1(t)e^{j2\pi(f_0-f_{sh})t} \quad (1)$$

At Step 302, the delay unit 211 delays the frequency-shifted data $P_{1\_sh}(t)$ to generate a delayed data $P_{1\_TC}(t)$, such that the data Csh in the data $P_{1\_sh}(t)$ and the data C' in the data $P_1(t)$ enter the first correlator 212 in synchronization, where $T_C$ represents the delay, i.e., 542 samples. The delayed data $P_{1\_TC}(t)$ is represented as:

$$P_{1\_TC}(t)P_1(t-T_c)e^{j2\pi(f_0-f_{sh})(t-T_c)} \quad (2)$$

At Step 304, the first correlator 212 performs correlation upon the data $P_1(t)$ and the delayed data $P_{1\_TC}(t)$ to generate a first correlated data $D_{cor\_1}$. Since the delayed data $P_{1\_TC}(t)$ is delayed by $T_C$, the data Csh in the data $P_{1\_sh}(t)$ and the data C' in the data $P_1(t)$ enter the first correlator 212 in synchronization and are correlated to generate the first correlated data $D_{cor\_1}$, as shown by the triangular waveform in FIG. 4a. The first correlated data $D_{cor\_1}$ is represented as:

$$D_{cor\_1}=P_1(t)P_1^*(t-T_c)e^{j2\pi f_0 T_c}e^{j2\pi f_{sh}(t-T_c)} \quad (3),$$

and is simplified to:

$$D_{cor\_1}=\{P_1(t)[P_1(t-T_c)e^{-j2\pi f_{sh}(t-T_c)}]*\}e^{j2\pi f_0 T_c} \quad (4)$$

At Step 306, the first filter 213 performs low-pass filtering upon the first correlated data $D_{cor\_1}$ to generate a first filtered data $D_{cor\_1\_fil}$. The first filtered data $D_{cor\_1\_fil}$ generated at a time point $t=2T_C$ approximates:

$$D_{cor\_1\_fil}=c_1 \cdot e^{j2\pi f_0 T_C}+N_{i1} \quad (5),$$

where $c_1$ is a constant and $N_{i1}$ is noise.

Figure 4A:
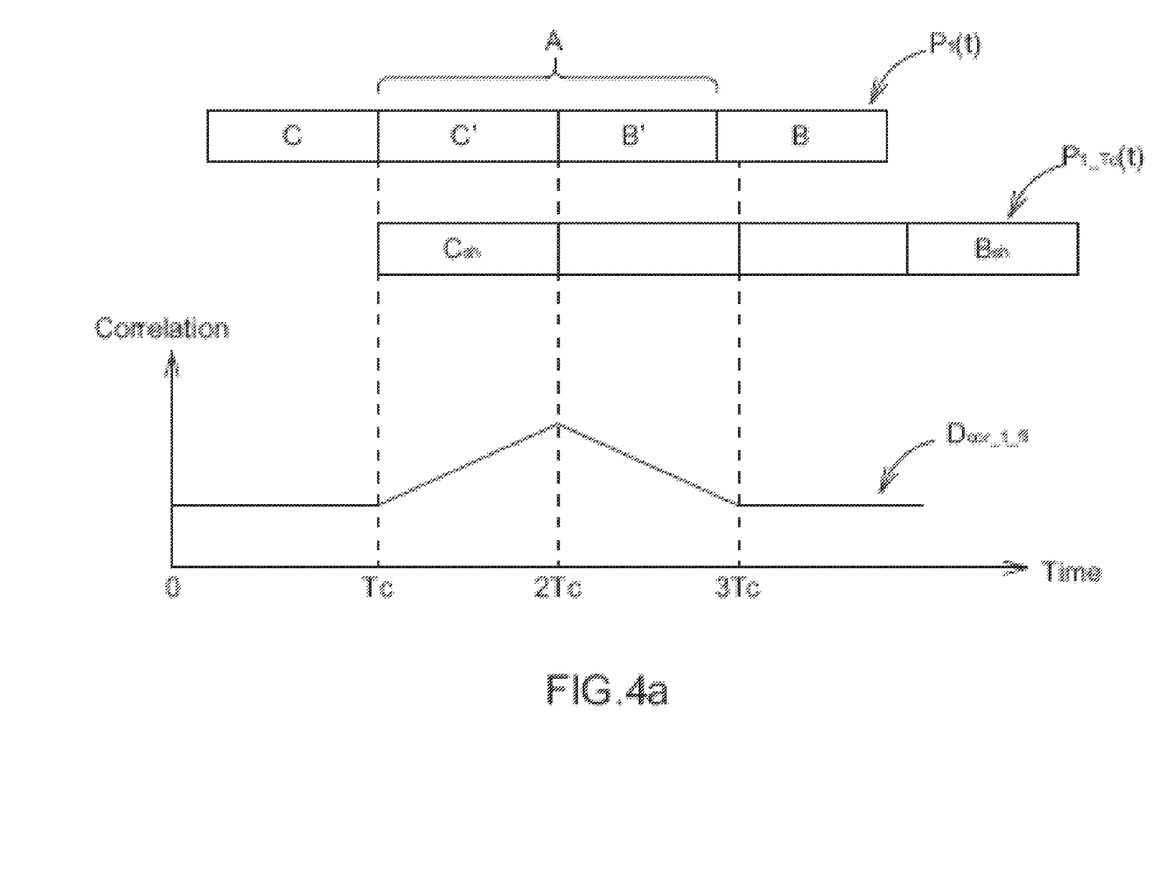
FIG. 4a is a schematic diagram of a data $P_1(t)$, a delayed data $P_{1\_TC}(t)$, and a first filtered data $D_{cor\_1\_fil}$.

Steps 300 to 306 can be better understood with reference to FIG. 4a showing a schematic diagram of the data $P_1(t)$, the delayed data $P_{1\_TC}(t)$, and the first filtered data $D_{cor\_1\_fil}$. At a time point $t=0$, the circuit 200 starts to receive the data $P_1(t)$ of the P1 symbol, followed by the frequency shifter 201 performing frequency shifting upon the data $P_1(t)$ to generate the frequency-shifted data $P_{1\_sh}(t)$ by performing frequency shifting upon the data C. The delay unit 211, providing a delay of $T_C$, delays the frequency-shifted data $P_{1\_sh}(t)$ by a time $T_C$ to generate the delayed data $P_{1\_TC}(t)$. At a time point $t=2T_C$, the data Csh and the data C' enter the first filter 213 in synchronization, which has a time-domain windowing length equal to the number of samples (i.e., approximately 542) of the data C in the P1 symbol, and hence a sharp peak in the first filtered data $D_{cor\_1\_fil}$ is reflected at this time point.

Similarly, at Step 308, the delay unit 221 delays the frequency-shifted data $P_{1\_sh}(t)$ to generate a delayed data $P_{1\_TB}(t)$, such that the data Bsh in the data $P_{1\_sh}(t)$ and the data B' in the data $P_1(t)$ enter the second correlator 222 in synchronization; wherein, the delay is $T_C$, i.e., 482 samples. The delayed data $P_{1\_TB}(t)$ is represented as:

$$P_{1\_TB}(t)=P_1(t-T_B)e^{j2\pi f_0(t-T_B)} \quad (6)$$

At Step 310, the second correlator 222 performs correlation upon the data $P_1(t)$ and the delayed data $P_{1\_TB}(t)$ to generate a second correlated data $D_{cor\_2}$. Since the delayed data $P_{1\_TB}(t)$ is delayed by $T_B$, the data Bsh in the data $P_{1\_sh}(t)$ and the data B' in the data $P_1(t)$ enter the second correlator 212 in synchronization and are correlated to generate the second correlated data $D_{cor\_2}$, as shown by the triangular waveform in FIG. 4a. The second correlated data $D_{cor\_2}$ is represented as:

$$D_{cor\_2}=P_1(t)P_1^*(t-T_B)e^{-j2\pi f_{sh}t}e^{j2\pi f_0 T_B} \quad (7)$$

and is simplified to:

$$D_{cor\_2}=\{[P_1(t)e^{-j2\pi f_{sh}t}]P_1(t-T_B)^*\}e^{j2\pi f_0 T_B} \qquad (8)$$

At Step 312, the second filter 223 performs low-pass filtering upon the second correlated data Dcor_2 to generate a second filtered data Dcor_2_fil. The second filtered data Dcor_2_fil generated at a time point t=2TC+2 TB approximates:

$$D_{cor\_2\_fil}=c_2\cdot e^{j2\pi f_0 T_B}+N_{i2} \qquad (9),$$

where $c_2$ is a constant and $N_{i2}$ is noise.

Figure 4B:
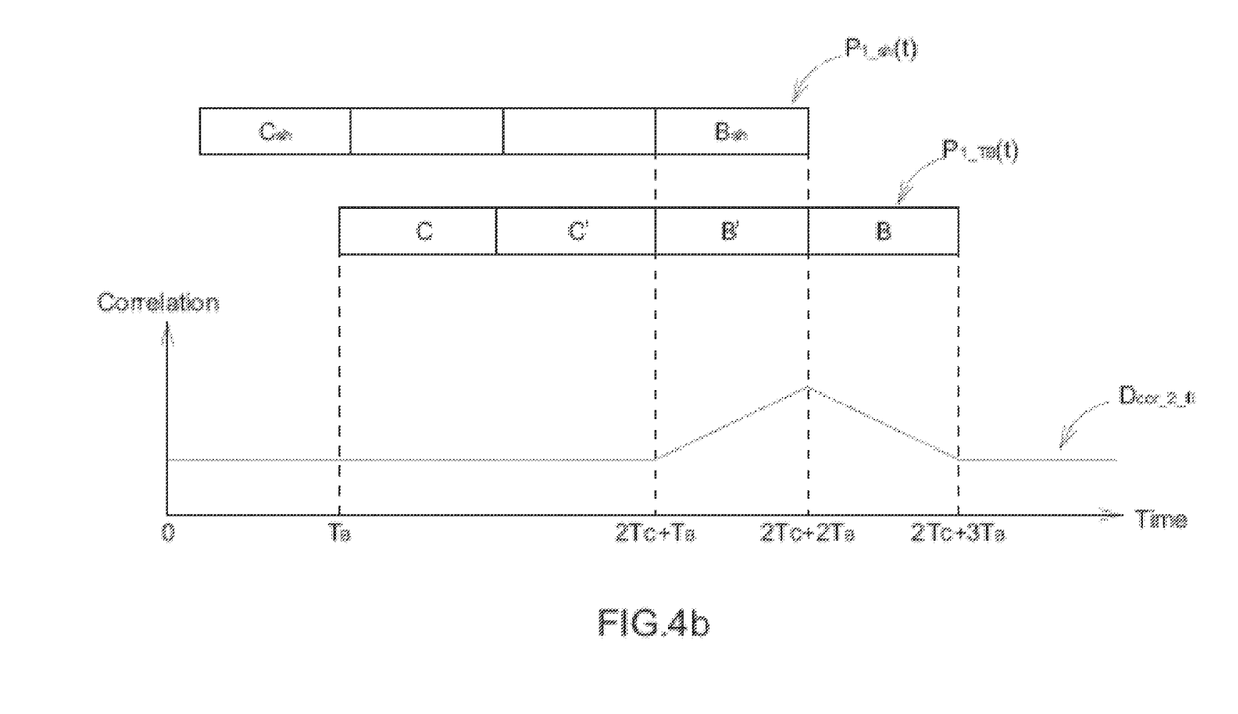
FIG. 4b is a schematic diagram of a frequency-shifted data $P_{1\_sh}(t)$, the delayed data $P_{1\_TB}(t)$, and a second filter correlated data $D_{cor\_2\_fil}$.

Steps 308 to 312 can be better understood with reference to FIG. 4b showing a schematic diagram of the frequency-shifted data P1_sh(t), the delayed data P1_TB(t), and the second filter correlated data Dcor_2_fil. At a time point t=0, the circuit 200 starts to receive the frequency-shifted data P1_sh(t) of the P1 symbol, followed by the frequency shifter 201 performing frequency shifting upon the data P1(t) to generate the frequency-shifted data P1_sh(t) by performing frequency shifting upon the data B. The delay unit 221, providing a delay of TB, delays the frequency-shifted data P1_sh(t) by a time TB to generate the delayed data P1_TB(t). At the time point t=2TC+TB, the data Bsh and the data B' enter the second filter 223 in synchronization, which has a time-domain windowing length equal to the number of samples (i.e., approximately 482) of the data B in the P1 symbol, and hence a sharp peak in the second filtered data Dcor_2_fil is reflected at this time point.

Figure 5:
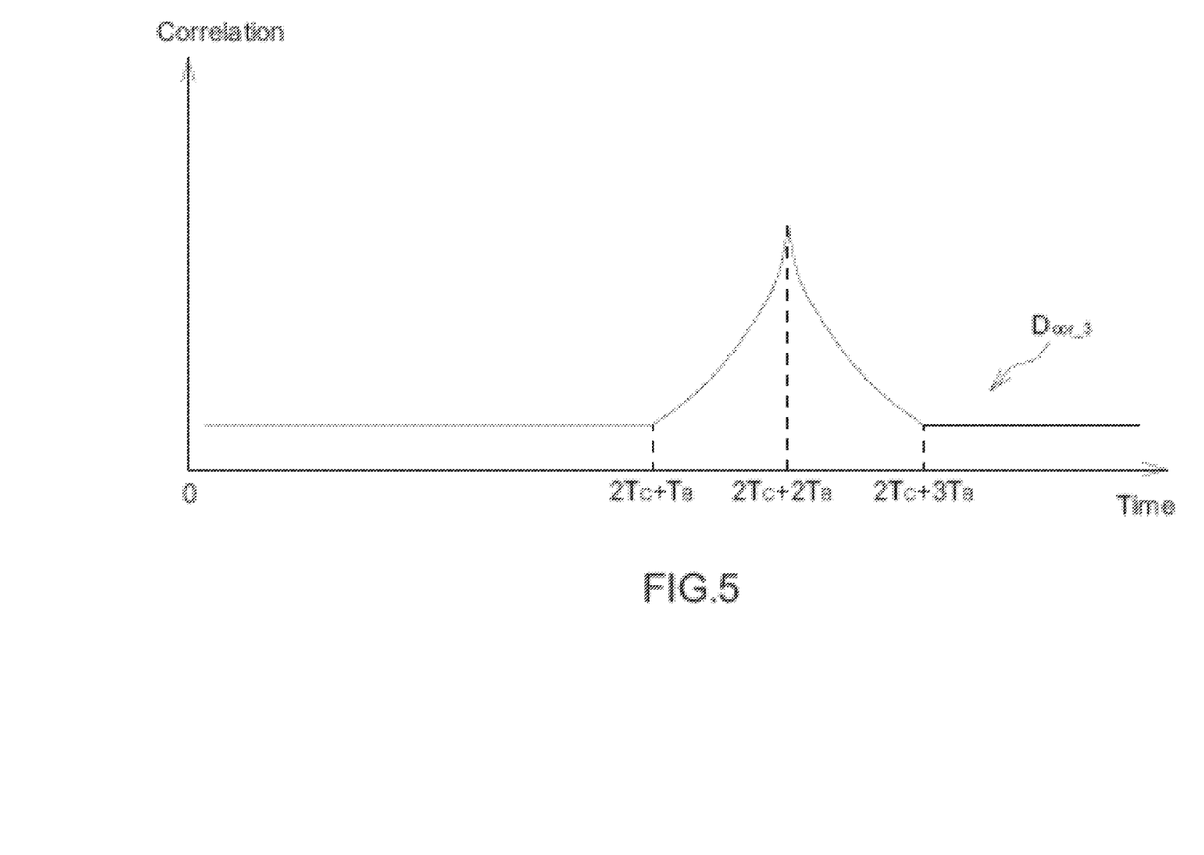
FIG. 5 is a schematic diagram of a third correlated data $D_{cor\_3}$.

At Step 314, as the first filtered data $D_{cor\_1\_fil}$ being delayed $2T_B$ by the delay unit 214, the peaks of the first filtered data $D_{cor\_1\_fil}$ and the second filtered data $D_{cor\_2\_fil}$ enter the multiplier 230 in synchronization, and are multiplied to obtain a third correlated data $D_{cor\_3}$, as shown in FIG. 5. Accordingly, a peak of the third correlated data $D_{cor\_3}$ is made even sharper to facilitate identification therefore. The third correlated data $D_{cor\_3}$ is represented as:

$$D_{cor\_3}=c_1 c_2 \cdot e^{j2\pi f_0(TC+TB)}+N_{i3} \qquad (10),$$

where $N_{i3}$ is noise. At Step 316, the decision unit 240 then determines the P1 symbol according to the peak of the third correlated data $D_{cor\_3}$.

More specifically, referring to the third correlated data $D_{cor\_3}$ in FIG. 5, the peak of the waveform of the third correlated data $D_{cor\_3}$ is located at the time point t=$2T_C+2T_B$ (supposing that the circuit starts to receive the beginning of the data $P_1(t)$ of the P1 symbol at the time point t=0), and therefore the decision unit 240 first detects a time point on the waveform where the peak of the third correlated data $D_{cor\_3}$ occurs, and then determines a start position of the data $P_1(t)$ of the P1 symbol by going back a time of $2T_C+2T_B$ from the time point detected, so as to retrieve the P1 symbol and transmit the retrieved P1 symbol to a subsequent processing unit for demodulation.

In the embodiment shown in FIG. 2, the circuit 200 determines a location of the P1 symbol in the digital data stream according to results from two paths, i.e., the two outputs of the first filter 213 and the second filter 223. However, in another embodiment according to the disclosure, the circuit 200 may also determine a location of the P1 symbol in the digital data stream according to a result from a single path, i.e., the output from either the first filter 213 or the second filter 223—a detailed description of such circuit is to be given below with reference to FIGS. 6 and 7.

Figure 6:
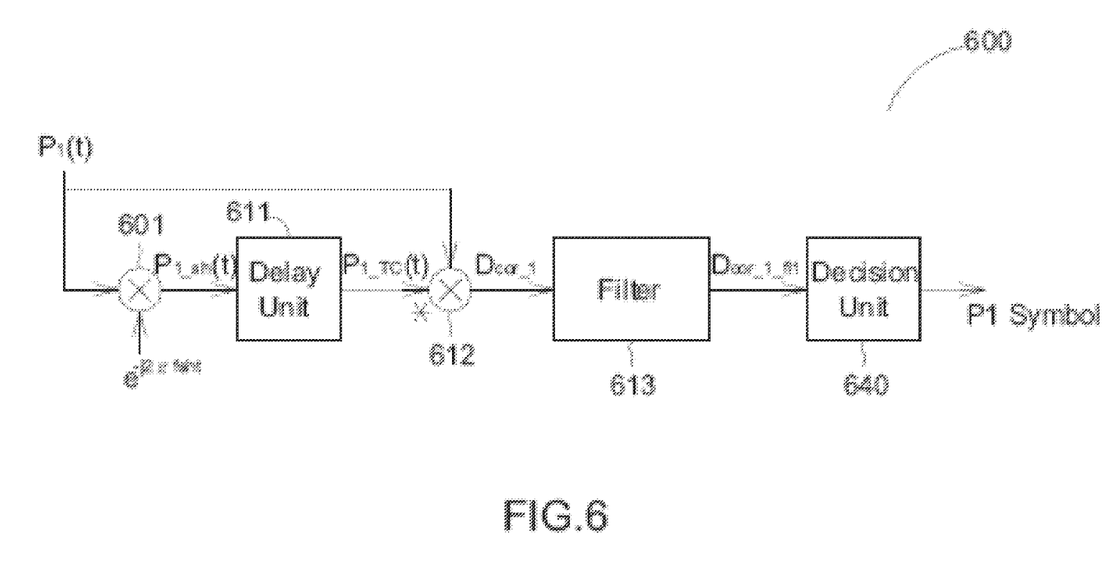
FIG. 6 is a schematic diagram of a circuit for detecting a predetermined symbol in a digital data stream according to a second embodiment of the disclosure.

FIG. 6 shows a schematic diagram of a circuit 600 for detecting a predetermined symbol in a digital data stream according to a second embodiment of the disclosure. As shown, the circuit 600 comprises a frequency shifter 601, a delay unit 611, a correlator 612, a filter 613 and a decision unit 640. In this embodiment, the frequency shifter 601, the delay unit 611, the correlator 612 and the filter 613 in the circuit 600 provide same functions respectively as the frequency shifter 201, the delay unit 211, the first correlator 212 and the first filter 213 shown in FIG. 2, and relationships between the data $P_{1\_sh}(t)$ of the P1 symbol, the delayed data $P_{1\_TC}(t)$ and the filtered correlated data $D_{cor\_1\_fil}$ are also identical to those shown in FIG. 4a; hence details thereof shall be not be again given for brevity.

A single peak of the waveform of the filtered correlated data $D_{cor\_1\_fil}$ is located at a time point t=$2T_C$ (supposing that the circuit 600 starts to receive the beginning of the data $P_1(t)$ of the P1 symbol at a time point t=0), and therefore the decision unit 640 first detects a time point on the waveform where the peak of the filtered correlated data $D_{cor\_1\_fil}$ occurs, and then determines a start position of the data $P_1(t)$ of the P1 symbol by going back a time of $2T_C$ from the detected time point, so as to retrieve the P1 symbol and transmit the retrieved P1 symbol to a subsequent processing unit for demodulation.

Figure 7:
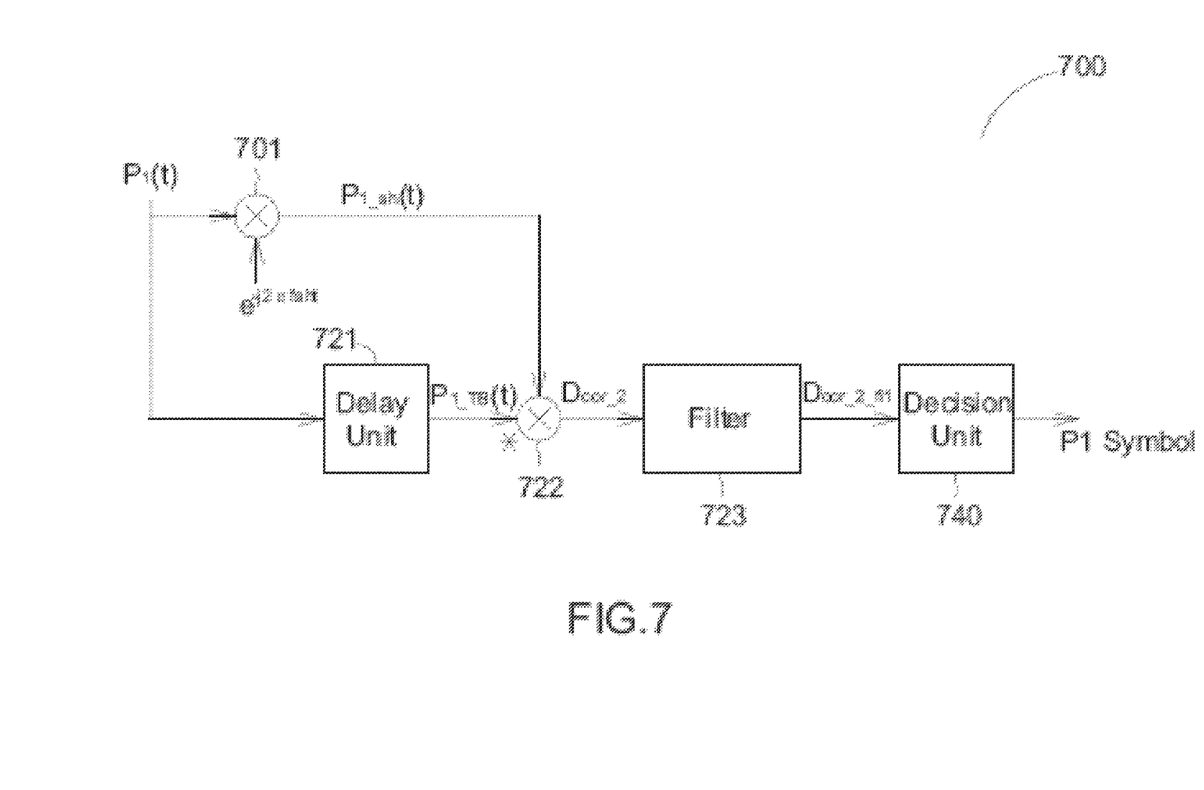
FIG. 7 is a schematic diagram of a circuit for detecting a predetermined symbol in a digital data stream according to a third embodiment of the disclosure.

FIG. 7 shows a schematic diagram of a circuit 700 for detecting a predetermined symbol in a digital data stream according to a third embodiment of the disclosure. As shown, the circuit 700 comprises a frequency shifter 701, a delay unit 721, a correlator 722, a filter 723 and a decision unit 740. In this embodiment, the frequency shifter 701, the delay unit 721, the correlator 722 and the filter 723 in the circuit 600 provide same functions respectively as the frequency shifter 201, the delay unit 221, the second correlator 222 and the second filter 223 shown in FIG. 2, and relationships between the data $P_{1\_sh}(t)$ of the P1 symbol, the delayed data $P_{1\_TB}(t)$ and the filtered correlated data $D_{cor\_2\_fil}$ are also identical to those shown in FIG. 4b; hence details thereof shall be not be again given for brevity.

A single peak of the waveform of the filtered correlated data $D_{cor\_2\_fil}$ is located at a time point t=$2T_C+2T_B$ (supposing that the circuit 700 starts to receive the beginning of the data $P_1(t)$ of the P1 symbol at the time point t=0), and therefore the decision unit 740 first detects a time point on the waveform where the peak of the filtered correlated data $D_{cor\_2\_fil}$ occurs, and then determines a start position of the data $P_1(t)$ of the P1 symbol by going back a time of $2T_C+2T_B$ from the detected time point, so as to retrieve the P1 symbol and transmit the retrieved P1 symbol to a subsequent processing unit for demodulation.

It is to be noted that, the embodiments shown in FIGS. 2, 6 and 7 are implemented in the DVB-T2 system, and the circuits 200, 600 and 700 are applied for detecting the P1 symbol in the digital data stream in the DVB-T2 system. However, the circuit according to the disclosure may also be applied to other systems that process a structure as the P1 symbol in the digital data stream shown in FIG. 2. That is, the circuit according to the disclosure is applicable in detecting a predetermined symbol in a digital data stream; the predetermined symbol is similar to the P1 symbol, as having a first data, a second data, a third data and a fourth data, the first data is generated by performing a predetermined operation upon the second data, and the fourth data is generated by performing a predetermined operation upon the third data; and the predetermined symbol is located at a beginning of a data frame of the digital data stream, and contains certain information at a transmitting end, such information of an FFT mode for data modulation and information of an antenna transceiving type for identifying multiple-input or single-input.

In conclusion, in a circuit for detecting a predetermined symbol in a digital data stream and an associated method, since a time-domain windowing filter is designed such that a filtered correlated data generated by the filter has a single sharp peak at a temporal waveform thereof, a time point where the sharp peak occurs is more accurately detected to accordingly determine a start position of the predetermined symbol in the digital data stream. Therefore, errors in subsequent data demodulation due an incorrect location of the P1 symbol are effectively prevented.

While the disclosure has been described in terms of what is presently considered to be the most practical and preferred embodiments, it is to be understood that the disclosure needs not to be limited to the above embodiments. On the contrary, it is intended to cover various modifications and similar arrangements included within the spirit and scope of the appended claims which are to be accorded with the broadest interpretation so as to encompass all such modifications and similar structures.

What is claimed is:

1. A circuit for detecting a predetermined symbol in a digital data stream, the predetermined symbol comprising a first data and a second data, the first data being generated by frequency shifting upon the second data, the circuit comprising:
    a frequency shifter that performs inverse-frequency shifting on the first data to generate a first frequency-shifted data;
    a first correlator that correlates the first frequency-shifted data and the second data to produce a first correlated data;
    a first filter that filters the first correlated data according to a first time-domain windowing length to generate a first filtered data; and
    a decision unit that determines the predetermined symbol from the digital data stream according to the first filtered data.

2. The circuit as claimed in claim 1, further comprising:
    a first delay unit that delays the first frequency-shifted data so that the first frequency-shifted data and the second data enter the first correlator in synchronization.

3. The circuit as claimed in claim 2, the predetermined symbol further comprising a third data and a fourth data, the fourth data being generated by frequency shifting upon the third data, the circuit further comprising:
    a second correlator that calculates a second correlated data according to the third data and a second frequency-shifted data, wherein the second frequency-shifted data is generated by performing inverse-frequency shifting upon the fourth data by the frequency shifter; and
    a second filter that filters the second correlated data according to a second time-domain windowing length to generate a second filtered data,
    wherein the decision unit determines the predetermined symbol from the digital data stream according to the first filtered data and the second filtered data.

4. The circuit as claimed in claim 3, wherein the first time-domain windowing length is, among all values of 2 to the power of n, a value closest to a number of samples of the first data, and wherein the second time-domain windowing length is, among all values of 2 to the power of m, a value closest to a number of samples of the third data, n and m being positive integers.

5. The circuit as claimed in claim 3, further comprising:
    a second delay unit that delays the third data so that the second frequency-shifted data and the third data enter the second correlator in synchronization.

6. The circuit as claimed in claim 5, wherein the second filtered data substantially has a single sharp peak at a temporal waveform thereof, and wherein the decision unit determines the predetermined symbol from the digital data stream only according to a location of the single sharp peak of the second filtered data.

7. The circuit as claimed in claim 5, further comprising:
    a multiplier that multiplies the first filtered data with the second filtered data to obtain a third correlated data; and
    a third delay unit that delays the first filtered data so that the single sharp peak of the first filtered data and the single sharp peak of the second filtered data enter the multiplier in synchronization,
    wherein the decision unit determines the predetermined symbol from the digital data stream according to the third correlated data.

8. The circuit as claimed in claim 1, wherein the predetermined symbol is located at a start position of a data frame of the digital data stream and comprises information for demodulating the data frame of the digital data stream.

9. The circuit as claimed in claim 1, wherein the first filtered data substantially has a single sharp peak at a temporal waveform thereof, and wherein the decision unit determines the predetermined symbol from the digital data stream according to a location of the single sharp peak of the first filtered data.

10. The circuit as claimed in claim 1, wherein the first time-domain windowing length is, among all values of 2 to the power of n, a value closest to a number of samples of the first data, n being a positive integer.

11. A method for detecting a predetermined symbol in a digital data stream, the predetermined symbol comprising a first data and a second data, the first data being generated by frequency shifting on the second data, the method comprising:
    performing inverse-frequency shifting on the first data to generate a first frequency-shifted data;
    correlating the first frequency-shifted data and the second data to produce a first correlated data;
    filtering the first correlated data according to a first time-domain windowing length to generate a first filtered data; and
    determining the predetermined symbol in the digital data stream according to the first filtered data.

12. The method as claimed in claim 11, further comprising:
    delaying the first frequency-shifted data so that the first frequency-shifted data and the second data are correlated in synchronization.

13. The method as claimed in claim 11, wherein the predetermined symbol is located at a start position of a data frame of the digital data stream and comprises information for demodulating the data frame of the digital data stream.

14. The method as claimed in claim 11, wherein the first filtered data substantially has a single sharp peak at a temporal waveform thereof, and wherein the predetermined symbol is determined from the digital data stream according to a location of the single sharp peak of the first filtered data.

15. The method as claimed in claim 11, wherein the first time-domain windowing length is, among all values of 2 to the power of n, a value closest to a number of samples of the first data, n being a positive integer.

16. The method as claimed in claim 11, the predetermined symbol further comprising a third data and a fourth data, the fourth data being generated by performing frequency shifting upon the third data, the method further comprising:
    correlating the third data and a second frequency-shifted data to produce a second correlated data, wherein the second frequency-shifted data is generated by performing inverse-frequency shifting upon the fourth data; and filtering the second correlated data according to a second time-domain windowing length to generate a second filtered data, wherein the step of determining the predetermined symbol determines the predetermined symbol from the digital data stream according to the first filtered data and the second filtered data.

17. The method as claimed in claim 16, wherein the first time-domain windowing length is, among all values of 2 to the power of n, a value closest to a number of samples of the first data or the second data, and wherein the second time-domain windowing length is, among all values of 2 to the power of m, a value closest to a number of samples of the third data or the fourth data, n and m being positive integers.

18. The method as claimed in claim 16, further comprising: delaying the third data so that the second frequency-shifted data and the third data are correlated in synchronization.

19. The method as claimed in claim 17, wherein the second filtered data substantially has a single sharp peak at a temporal waveform thereof, and wherein the step of determining the predetermined symbol determines the predetermined symbol from the digital data stream only according to the single sharp peak of the second filtered data.

20. The method as claimed in claim 18, further comprising:
delaying the first filtered data so that the single sharp peak of the first filtered data and the single sharp peak of the second filtered data are multiplied in synchronization; and multiplying the delayed first filtered data with the second filtered data to obtain a third correlated data, wherein the step of determining the predetermined symbol determines the predetermined symbol from the digital data stream according to the third correlated data.

* * * * *